United States Patent [19]

Baines

[11] Patent Number: 4,829,254

[45] Date of Patent: May 9, 1989

[54] ELECTRIC MOTOR WITH VELOCITY INDICATING DEVICE

[75] Inventor: Roger F. Baines, Repulse Bay, Hong Kong

[73] Assignee: Johnson Electric Industrial, Manufactory Ltd., Chaiwan, Hong Kong

[21] Appl. No.: 91,028

[22] Filed: Aug. 31, 1987

[30] Foreign Application Priority Data

Sep. 3, 1986 [GB] United Kingdom ............... 8621295

[51] Int. Cl.⁴ ........................... G01P 3/48; G01P 3/54
[52] U.S. Cl. .................................... 324/167; 324/173
[58] Field of Search ............... 324/173, 174, 167, 208, 324/158 MG; 310/68 R, 68 B, 239

[56] References Cited

U.S. PATENT DOCUMENTS

| 3,731,126 | 5/1973 | Hagenlocher et al. | 310/239 |
| 3,790,832 | 2/1974 | Patel | 310/239 |
| 4,695,795 | 9/1987 | Nakamizo et al. | 324/208 |
| 4,701,650 | 10/1987 | Maemine | 310/68 R |

FOREIGN PATENT DOCUMENTS

| 0226356 | 6/1987 | European Pat. Off. . |
| 639111 | 6/1950 | United Kingdom . |
| 1317092 | 5/1973 | United Kingdom . |
| 1545777 | 5/1979 | United Kingdom . |

Primary Examiner—Reinhard J. Eisenzopf
Assistant Examiner—Anthony L. Miele
Attorney, Agent, or Firm—Fleit, Jacobson, Cohn & Price

[57] ABSTRACT

A fractional horsepower permanent magnet direct-current motor has a velocity indicating device positioned around the commutator, between the brush gear and the armature. The device comprises a conductor in the form of a square wave copper strip which is printed on a flexible support and centered on a circle about the motor shaft, and a magnet assembly mounted on the armature. Magnet assembly comprises radially extending blades which are formed from plastics bonded magnetic material. The blades are magnetized so that adjacent blades have opposite polarity. As the magnet rotates with the shaft, the blades move relative to the conductor and so induce an electrical signal in the conductor. The signal can be monitored to indicate the motor speed as is generally known. The blades also act as a centrifugal fan, helping to cool the motor.

14 Claims, 2 Drawing Sheets

ELECTRIC MOTOR WITH VELOCITY INDICATING DEVICE

INTRODUCTION

The invention relates to an electric motor having a device for indicating the velocity of the motor. In particular the invention relates to a fractional horsepower permanent magnet direct current (PMDC) motor incorporating such a device.

BACKGROUND

It is known to add a device to an electric motor to generate a signal bearing information about the velocity of the motor so that the signal can be used to feedback information to effect some control over the motor behaviour.

It is usual for the velocity signal generator either to be constructed as an integral part of the motor or to be added as an optional extra to the outside of the motor. In either case, existing designs demand that the total package be larger than the motor alone. Furthermore if the velocity signal generator is added on to a standard motor is usually interferes in some way with access to the motor terminals or ventilation of the motor and increases the motor dimensions.

Space within a well designed motor is usually effectively occupied and there is almost no volume free for adding any components.

This invention aims to provide a velocity signal generator within a standard motor without increasing the motor dimensions or adversely affecting the motor construction or performance.

There is a small section conventional commutator motors where space is not used but exists because of the manner of construction of a wound armature. Since segments of the motor commutator have to be connected to the windings on the stack of lamination forming the armature some provision has to be made for hooks on the segments to secure the wire, with subsequent welding or soldering to connect the winding to the segment. This requires that the commutator length be somewhat longer than is required just for making contact with the brushes, which feed power to the commutator. Extending outward radially from that area of the commutator where the hooks exist is usually empty space all the way to the motor boundary formed by the motor housing. This space, which is small, is seldom used.

SUMMARY OF THE INVENTION

The present invention provides an electric motor having a housing, a rotor mounted in the housing and comprising a wound armature and a commutator electrically connected to the winding of the armature, and brush gear bearing on the commutator, wherein velocity detecting means is provided between the brush gear and the armature, the detecting means comprising magnet means mounted on the rotor between the armature and the brush gear for rotation with the rotor, and conductor means mounted in the motor housing adjacent the path of rotation of the magnet means, the arrangement being such that rotation of the magnet means relative to the conductor means will induce an electrical signal in the conductor means indicative of the speed of rotation of the rotor.

Preferably the magnet means is mounted on an end of the armature, adjacent the commutator, and comprises an array of alternating north and south poles extending circumferentially around the rotor.

Very preferably the magnet means comprises a plurality of radially extending blades, each blade having a magnetic pole at an end thereof, the poles alternating north and south in the circumferential direction. The blades may form a centrifugal fan, drawing air over the commutator and expelling it through vent holes positioned in the housing radially of the blades.

Preferably the conductor means comprises a printed circuit. Preferably the conductor follows a wave-shaped path (preferably a square wave path) relative to a circle extending around the rotor.

A pair of magnetic poles is provided on the magnet means for each cycle of the wave-shaped path.

Preferably the conductor is arranged on an annular ring in a plane perpendicular to the axis of rotation of the rotor. Very preferably the ring is adjacent an end of a stator of the motor, the stator surrounding the armature, on the opposite side of the magnet means to the brush gear.

The printed circuit may be flexible and supported on a rigid plastic or metal ring. A metal ring, such as steel, may be preferred to isolate the conductor from the stator to reduce electrical noise. Very preferably the conductor comprises several layers, to increase the signal induced in the conductor. This may be formed by printing the circuit on several rings of support material, the rings being integrally connected one to another and the conductor being arranged to cross from one ring to another via the connection. To form the conductor the rings may then be folded together.

Other preferred features and advantages of the invention will be apparent from the following description and the accompanying claims.

BRIEF DESCRIPTION OF THE DRAWINGS

FIG. 3b is a cross-section on line IIIb—IIIb of FIG. 3a; and

DESCRIPTION OF PREFERRED EMBODIMENT

Figure 1:
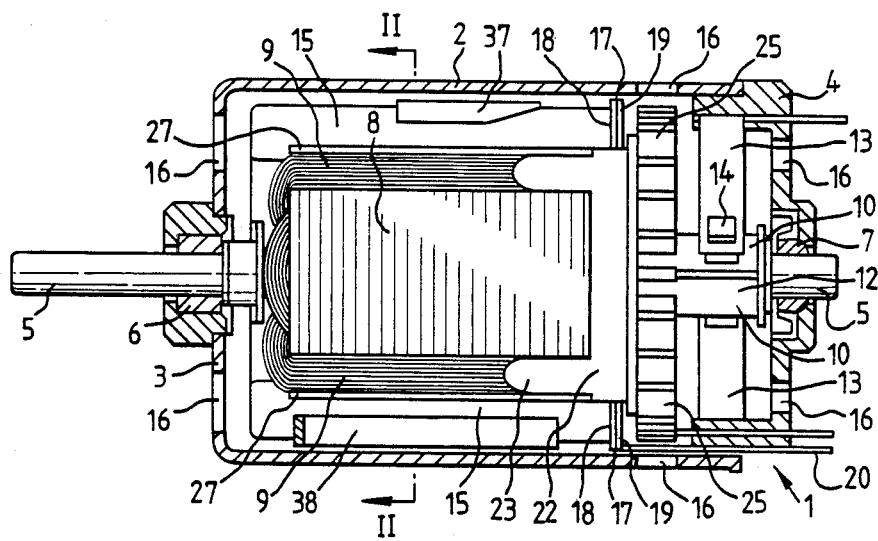
FIG. 1 is a schematic cross-sectional view of a PMDC motor embodying the invention.
Figure 2:
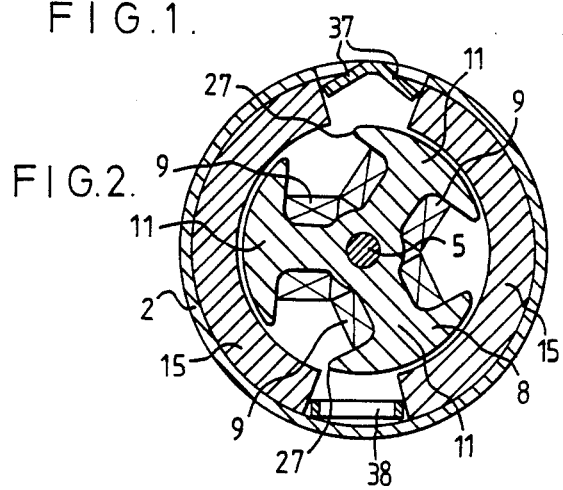
FIG. 2 is a cross-section along the line II—II of FIG. 1.
Figure 3A:
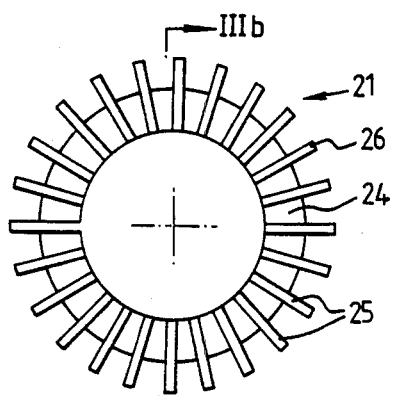
FIG. 3a is an end view of a magnet and fan device used in the motor of FIG. 1.
Figure 3B:
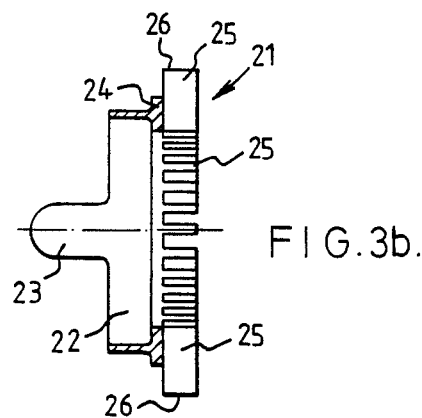

FIG. 1 illustrates the main parts of a typical fractional horsepower PMDC motor which has been modified to embody the invention. The construction and manufacture of such motors are well known in the art and need be described only briefly here.

The motor 1 has a housing comprising a deep drawn can-like steel casing 2 closed at one end 3 and a plastics end cap 4 which closes the opposite end of the casing 2.

A rotor assembly comprises a shaft 5 journalled in bearings 6, 7 in the casing end 3 and end cap 4. Mounted fast on shaft 5 is an armature 8 which is formed from a stack of steel laminations press fitted on the shaft 5. In radial cross-section the armature has three mushroom shaped poles 11 extending from a central core (a different number may be provided in some applications). A coil 9 is wound around each pole 11 and the ends of each coil are connected to segments 10 of a commutator 12 mounted fast on the shaft 5. End cap 4 carries brush gear comprising two brush leaves 13 which each support a brush 14 bearing on the commutator 12.

Two permanent magnets 15 are mounted in the casing 2 and form a stator of the motor. The magnets 15 are held in position between a pair of ears 37 pressed from the casing 2 and a U-shaped spring 38.

Vent apertures 16 are provided in the casing wall radially opposite the commutator 12 and also in the end wall 3 and end cap 4.

Such a construction is well known in the art. To assemble the motor, the magnets are installed in the casing and the rotor assembly then inserted between the magnets. End cap 4 carrying the brush assembly is attached to the open end of the casing 2, the brushes being kept clear of the commutator until the end cap is mounted, to avoid damage to the brushes during assembly.

The improvement provided by the present invention resides in the provision of a velocity detector in the region between the armature 8 and the brush gear 13, 14, that is about the area of the commutator 12 which is used to connect the armature coils 9 to the commutator 12.

An annular steel plate 17 is positioned on the axial ends 18 of the magnets 15. The annular plate 17 is of the same radial width as the magnets 15 to avoid fouling the rotor assembly. A conductor 19 in the form of a printed circuit on a flexible plastics annular ring is mounted on the plate 17. It may be bonded to the plate 17. A tab 20 extends from the conductor and outside of the housing for electrical connection to a monitoring device (not shown) which detects signals induced in the conductor during operation of the motor, and so enables the motor speed to be calculated.

Figure 4:
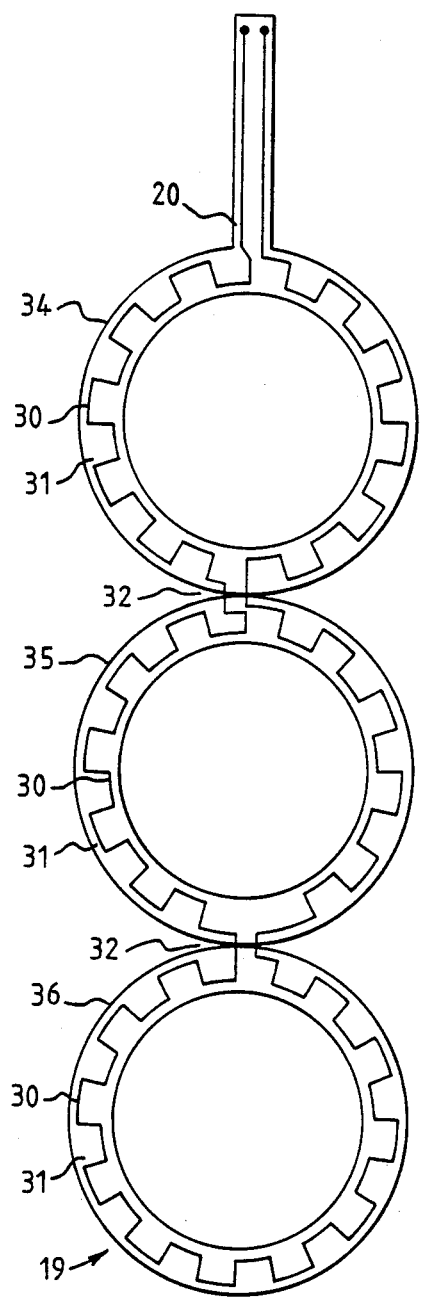
FIG. 4 illustrates a method of forming a detecting conductor for the motor of FIG. 1.

Referring to FIG. 4, the conductor 19 comprises a sinuous copper strip 30 printed on a flexible plastics base 31. Base 31 is in the form of three annular rings connected along fold lines 32. Strip 30 extends around each ring as a square wave. The conductor begins at tab 20, passes around one half of first ring 34, onto adjacent ring 35 across the fold line 32 after completing nearly 6 cycles, and similarly around ring 35 onto ring 36 and back in a similar way to tab 20. The base 31 is folded at the fold lines 32 to form a three layer conductor. The path of the conductor is arranged so that signals produced in each layer of the conductor add to one another. By providing a plurality of layers the signal to noise ratio may be enhanced.

A magnet assembly 21 for inducing signals in the conductor is mounted on an end of the armature 8, adjacent the commutator 12. Assembly 21 is integrally moulded from plastics bonded magnetic material. Such material is well known in the art. After moulding the material can be magnetised in any desired manner.

The assembly 21 comprises a cylindrical collar 22 whose outer diameter is equal to that of the armature 8. Three arms 23 extend from a rear end of the collar 22 and a radially inwardly directed annular ring 24 is formed on the other end of the collar 22. Twenty four radially extending fan blades 25 are formed on the ring 24.

After moulding, the blades 25 are magnetised so that the radially outer ends 26 of adjacent blades have opposite polarity, alternating north-south around the outer circumference of the assembly. To mount the assembly 21 on the armature 8, the arms 23 are bonded between the facing edges 27 of the poles 11 of the armature 8, the cylindrical collar 22 abutting against the end of the armature 8. The blades 25 are dimensioned to extend out near to the casing 2, and pass close to the conductor 19.

To assemble the motor, the steel ring 18 and printed circuit 19 are positioned on the magnets 15. The magnet assembly 21 is bonded to the armature 8 of the assembled rotor, the eye of the ring 24 passing over the commutator 12 and the connections to the armature windings. The rotor is then installed between the magnets 15. The end cap 4 is then fitted to the motor casing 2. The tab 20 may be fed out of the housing between the end cap 4 and casing 2 as shown in FIG. 1.

In operation, as the motor rotates, an electrical signal is induced in the conductor 19 by the magnet assembly 21, the frequency and amplitude of the signal being indicative of the speed of rotation of the motor. An arrangement of 24 blades and 12 conductor cycles giving 12 pulses per rotation of the motor. The signal is fed out of the motor via tab 20 which can be connected to any appropriate monitoring device.

By blocking off the tunnels formed between the magnets 15 by the ring 18, the circulation of air through the tunnels is inhibited, so that air is preferentially drawn over the commutator 12 and forced out of apertures 16 in the casing wall by the fan blades 25.

Various modifications may be made to the described embodiment and it is desired to include all such modifications as fall within the scope of the accompanying claims. For example, the number of blades 25 may be varied, to increase the signal strength and frequency, the number of cycles of the conductor matching the number of pairs of magnet blades.

What is claimed is:

1. An electric motor having a housing, a rotor rotatably mounted in the housing and comprising a shaft, a wound armature and a commutator mounted fast on the shaft and electrically connected to a winding of the armature, and brush gear bearing on the commutator, wherein velocity detecting means is provided in the motor housing between the brush gear and the armature, the detecting means comprising magnet means mounted on the rotor between the armature and the brush gear for rotation along a path with the rotor, and conductor means mounted in the motor housing adjacent the path of rotation of the magnet means, the arrangement being such that rotation of the magnet means relative to the conductor means induces an electrical signal in the conductor means indicative of the speed of rotation of the rotor, wherein the magnet means comprises a plurality of radially extending fan blades, radially outer ends of circumferentially adjacent fan blades having opposite polarity.

2. A motor as claimed in claim 1, wherein apertures are provided in the housing adjacent the radially outer ends of the fan blades.

3. A motor as claimed in claim 1, wherein said conductor is square wave-shaped and arranged in a circle centered on an axis of rotation of the rotor.

4. A motor as claimed in claim 3, wherein the conductor is square wave shaped.

5. A motor as claimed in claim 4, wherein the conductor is printed on an annular flexible plastics support.

6. An electric motor having a housing, a rotor rotatably mounted in the housing and comprising a shaft, a wound armature and a commutator mounted fast on the shaft and electrically connected to a winding of the armature, and brush gear bearing on the commutator, wherein velocity detecting means is provided in the motor housing between the brush gear and the armature, the detecting means comprising magnet means mounted on the rotor between the armature and the brush gear for rotation along a path with the rotor, and conductor means mounted in the motor housing adjacent the path of rotation of the magnet means, the arrangement being such that rotation of the magnet means relative to the conductor means induces an electrical signal in the conductor means indicative of the speed of rotation of the rotor, wherein said conductor is square wave-shaped and arranged in a circle centered on an axis of rotation of the rotor, wherein the conductor is printed on an annular flexible plastics support, and wherein said conductor is formed in a plurality of layers, each layer printed on a respective said annular support, said supports being integral with one another and folded together, the conductor paths in the layers being in register with each other.

7. A motor as claimed in claim 6, wherein said conductor is positioned on an end of a stator of the motor.

8. A motor as claimed in claim 7, wherein the motor is a permanent magnet direct current motor.

9. An electric motor having a housing, a rotor rotatably mounted in the housing and comprising a shaft, a wound armature and a commutator mounted fast on the shaft and electrically connected to a winding of the armature, and brush gear bearing on the commutator, wherein velocity detecting means is provided in the motor housing between the brush gear and the armature, the detecting means comprising magnet means mounted on the rotor between the armature and the brush gear for rotation along a path with the rotor, and conductor means mounted in the motor housing adjacent the path of rotation of the magnet means, the arrangement being such that rotation of the magnet means relative to the conductor means induces an electrical signal in the conductor means indicative of the speed of rotation of the rotor, wherein said conductor is wave-shaped and arranged in a circle centered on an axis of rotation of the rotor, wherein the conductor is a printed circuit, printed on an annular flexible plastics support, and wherein said conductor is formed in a plurality of layers, each layer printed on a respective said annular support, said supports being integral with one another and folded together, the conductor paths in the layers being in register with each other.

10. A motor as claimed in claim 9, wherein said conductor is positioned on an end of a stator of the motor.

11. A motor as claimed in claim 10, wherein the motor is a permanent magnet direct current motor.

12. A motor as claimed in claim 10, wherein the conductor is supported on an annular ferromagnetic ring positioned between the conductor and the stator.

13. A motor as claimed in claim 6, wherein the magnet means comprises a plurality of radially extending fan blades, radially outer ends of circumferentially adjacent fan blades having opposite polarity.

14. A motor as claimed in claim 1, wherein said conductor is formed in a plurality of layers, each layer printed on a respective said annular support, said supports being integral with one another and folded together, the conductor paths in the layers being in register with each other.

* * * * *